US006572996B1

(12) United States Patent
Isenberg et al.

(10) Patent No.: US 6,572,996 B1
(45) Date of Patent: Jun. 3, 2003

(54) ELECTROCHEMICAL FUEL DEPLETION MEANS FOR FUEL CELL GENERATORS

(75) Inventors: Arnold O. Isenberg, Pittsburgh, PA (US); Stephen E. Veyo, Murrysville, PA (US); Srikanth Gopalan, Monroeville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/636,247

(22) Filed: Aug. 10, 2000

(51) Int. Cl.$^7$ .............................. H01M 8/12; H01M 8/04
(52) U.S. Cl. .............................. 429/31; 429/19; 429/21; 429/34
(58) Field of Search .............................. 429/17, 19, 21, 429/31, 34

(56) References Cited

U.S. PATENT DOCUMENTS

| | | |
|---|---|---|
| 4,395,468 A | 7/1983 | Isenberg |
| 4,664,986 A | 5/1987 | Draper et al. |
| 4,751,151 A | 6/1988 | Healy et al. |
| 4,983,471 A * | 1/1991 | Reichner et al. ............... 429/19 |
| 5,064,733 A | 11/1991 | Krist et al. |
| 5,082,751 A * | 1/1992 | Reichner ..................... 429/19 |
| 5,134,043 A | 7/1992 | Nakazawa |
| 5,573,867 A | 11/1996 | Zafred et al. |
| 5,712,055 A | 1/1998 | Khandkar et al. |
| 5,733,675 A | 3/1998 | Dederer et al. |
| 5,866,090 A | 2/1999 | Nakagawa et al. |
| 5,928,806 A | 7/1999 | Olah et al. |
| 6,033,794 A | 3/2000 | George et al. |

FOREIGN PATENT DOCUMENTS

| | | |
|---|---|---|
| EP | 0482222 | 4/1992 |
| FR | 2125729 | 9/1972 |
| JP | 63166157 | 7/1988 |
| JP | 04000108 | 1/1992 |
| JP | 04087262 | 3/1992 |
| JP | 2000268832 | 9/1992 |
| JP | 05003046 | 1/1993 |

* cited by examiner

Primary Examiner—John S. Maples

(57) ABSTRACT

A fuel cell generator contains a plurality of fuel cells (6) in a generator chamber (1) and also contains a fuel reactor chamber (2) containing either fuel cells or electrolysis cells as the depleted fuel reactor means, which means preferably has copper fuel electrodes, where oxidant (24,25) and fuel (81) are fed to the generator chamber (1), where both fuel and oxidant react, and where all oxidant and fuel passages are separate and do not communicate with each other, so that fuel and oxidant in whatever form do not mix and where a depleted fuel exit (23) is provided for exiting a product gas which consists essentially of carbon dioxide and water for further treatment so that carbon dioxide can be separated and is not vented to the atmosphere.

10 Claims, 4 Drawing Sheets

ELECTROCHEMICAL FUEL DEPLETION MEANS FOR FUEL CELL GENERATORS

BACKGROUND OF THE INVENTION

1. Field of the Invention

The present invention relates to high temperature fuel cell generators wherein depleted fuel and depleted air are kept separate from each other to allow treatment of depleted fuel by a special apparatus to separate essentially pure carbon dioxide from depleted fuel.

2. Background Information

Tubular, solid oxide electrolyte fuel cell "SOFC" generators have been well known in the art for almost twenty years, and taught, for example by A. O. Isenberg in U.S. Pat. No. 4,395,468. There, in the main embodiment, air, as oxidant, reacted at the inside "air" electrode of a closed tubular SOFC, to yield depleted air; and fuel, such as CO and $H_2$, reacted at an outside "fuel" electrode of the closed tubular SOFC to yield depleted fuel, all in a "generating chamber," at high temperatures (for example, about 1000° C.). The air electrode generally comprised a doped lanthanum manganite, the fuel electrode generally comprised a nickel cermet and an electrolyte disposed between the electrodes generally comprised a stabilized zirconia. The depleted fuel was subsequently completely combusted with the depleted air in a separate combustion chamber, to preheat feed air. This basic SOFC generator design was carried forward, with other improvements, as shown for example in U.S. Pat. Nos.: 4,664,986; 5,573,867; and 5,733,675 (Draper et al.; Zafred et al. and Dederer et al.). Other designs have used a series of fuel cell stacks, each providing a stage containing a different electrolyte operating at a lower temperature to improve fuel gas utilization, as taught in U.S. Pat. No. 5,712,055 (Khandkar). In a somewhat similar fashion, in one embodiment of U.S. Pat. No. 5,134,043 (Nakagawa), "depleted fuel" from a first molten carbonate fuel cell system was sent to a separate molten carbonate anode, where the product was then mixed/contacted with oxidant/air before being introduced into the cathode section of the first molten carbonate electrolyte fuel cell. While tubular fuel cells are emphasized herein, flat/planar fuel cells, which are well known in the art, may also be used.

However, such designs could release byproducts of combustion, such as carbon dioxide into the atmosphere. Efforts are now being made on an international level to globally reduce the release of so-called "green house gasses" which includes carbon dioxide, which may contribute to global atmospheric warming. Such efforts may, indeed, lead to future legislation regarding carbon dioxide emissions from SOFC's. What is needed is a means to further treat the spent fuel from fuel cell generators to not only reduce or eliminate carbon dioxide emissions but also to increase the capacity of the fuel cell generators to further utilize feed fuel. Such a need applies to both tubular and flat plate type fuel cells.

In the area of reducing carbon dioxide emissions from power plants utilizing a variety of types of fuel cells, in order to reduce the "green house effect", U.S. Pat. No. 4,751,151 (Healy et al.) taught a carbon dioxide absorber, such as monoethanolamine, included as a regenerable carbon dioxide absorbent, for stripping carbon dioxide, followed by subsequent cooling and compression. U.S. Pat. No. 5,064,733 (Krist et al.), recognizing prior art conversion of natural gas into DC electricity plus carbon dioxide and water-with the accompanying creation of a DC electrical power-in a solid oxide fuel cell taught conversion of the carbon dioxide and water to $C_2H_4$, $C_2H_6$ and $C_2H_2$ by use of a copper, copper alloy or perovskite cathode. That cathode was in contact with the $CO_2$, and $H_2O$ and a dual layered anode made of metal oxide perovskite next to the electrode with an outer contacting layer of rare earth metal oxide contacting $CH_4$. This provided for concurrent gas phase electrocatalytic oxidative dimerization of methane at an anode on one side of a solid electrolyte and reduction of carbon dioxide to gaseous hydrocarbons at a cathode on the other side of the solid electrolyte. Other $CO_2$ treatments include U.S. Pat. No. 5,928,806 (Olah et al.), where a regenerative fuel cell system containing two electrochemical cells in fluid communication were taught, one cell oxidizing an oxygenated hydrocarbon, such as methyl alcohol, formic acid, etc., to $CO_2$ and $H_2O$ and a second cell reducing $CO_2$ and $H_2O$ to an oxygenated hydrocarbon. This produced methyl alcohol and related compounds directly from $CO_2$. Also, U.S. Pat. No. 5,866,090, (Nakagawa et al.) taught reacting carbon dioxide containing exhaust, from a power plant which uses fuel cells, with a composition containing lithium zirconate at approximately 450° C., so that the carbon dioxide reacts with the lithium zirconate to produce lithium carbonate and zirconia. The lithium carbonate and zirconia are then subjected to a temperature of 600° C. or more, so as to produce lithium zirconate and pure carbon dioxide.

While a great many methods to treat carbon dioxide are known, a new fuel cell generator design is needed to allow segregation and further concentration of the carbon dioxide for such treatment.

SUMMARY OF THE INVENTION

Therefore it is a main object of this invention to provide an improved fuel cell generator design, allowing segregation of carbon dioxide generated at the fuel electrodes by an integrated secondary fuel reactor means.

It is a further object of this invention to provide an improved generator design allowing ultra high fuel utilization capacity by use of an integrated secondary fuel reactor means.

These and other objects are accomplished by providing a high temperature fuel cell generator comprising a separate generator chamber containing tubular solid oxide electrolyte fuel cells which operate on oxidant and fuel to yield depleted oxidant and depleted fuel, and a separate fuel reactor chamber containing a depleted fuel reactor-selected from a fuel cell and an electrolysis cell, and potentially operating at a different temperature than the generator chamber-where all oxidant and fuel passages are separated and do not communicate directly with each other, so that fuel and oxidant remain effectively separated, where a depleted fuel exit is provided in the separate fuel reactor chamber for exiting a gas consisting essentially of carbon dioxide and water for further treatment, and where depleted oxidant exits are provided to exhaust to the environment.

The invention also comprises a high temperature fuel cell generator, comprising: a housing defining and separating a generator chamber; a separate fuel reactor chamber; a depleted oxidant discharge chamber; a plurality of fuel cells, each having an electrolyte contacted on one side by an air electrode and on the other side by a fuel electrode, said fuel cells disposed within the generator chamber; means to react substantially all of the fuel, said means selected from oxidant-fed fuel cells and steam-fed electrolysis cells disposed in the separate fuel reactor chamber; means to flow a feed fuel gas to contact the fuel electrode of fuel cells in the generator chamber, where said fuel can react and provide partially depleted fuel gas; means to flow a feed oxidant gas to contact the air electrode of fuel cells in the generator chamber, where said oxidant can react and provide a depleted oxidant gas; means to flow a second feed oxidant gas to the separate fuel reactor chamber, where the means to react substantially all of the fuel is a fuel cell, or means to flow steam to the separate fuel reactor chamber, where the means to react substantially all of the fuel is an electrolysis cell; and means to flow partially depleted fuel gas from the generator chamber to contact the outside of the means to react substantially all of the fuel in the separate fuel reactor chamber, where said depleted fuel can further react and provide a completely depleted fuel gas consisting essentially of carbon dioxide and water, where depleted oxidant gases are kept separated from all depleted fuel gases and said depleted oxidant gases flow into a separate depleted oxidant discharge chamber.

The invention also covers a method of operating a high temperature fuel cell generator comprising a separate generator chamber and a separate fuel reactor chamber, the generator chamber containing oxidant-fed tubular solid oxide fuel cells and the separate fuel reactor chamber containing means to react substantially all of the fuel, selected from oxidant-fed fuel cells and steam-fed electrolysis cells, comprising the steps of: (1) feeding feed fuel gas to contact fuel electrodes of fuel cells in the generator chamber to provide partially depleted fuel gas, (2) feeding partially depleted fuel gas to contact the outside of the means to react substantially all of the fuel in the separate fuel reactor chamber, to provide completely depleted fuel gas consisting essentially of carbon dioxide and water, (3) feeding feed oxidant gas to fuel cells in the generator chamber to provide depleted oxidant gas, and (4) feeding a second feed oxidant gas to contact fuel cells in the separate fuel reactor chamber or steam to contact electrolysis cells in the separate fuel reactor chamber; where oxidant gases are kept separated from all fuel gases.

Thus, this invention relates to an arrangement of components within a fuel cell generator by means of which the exhausted $CO_2$ and $H_2O$ are sequestered by separate fuel depletion means to react substantially all of the fuel, where such means can be extra banks of fuel cells or, preferably, electrolysis cells. By this means, the water can be condensed from the product exhaust stream, and the carbon dioxide can be pressurized or liquefied and put to use, rather than being released to the atmosphere. Consequently the release of a "green house gas" pollutant is avoided. The main idea is to produce electric power and sequester carbon dioxide. The secondary fuel reactor means-either a set of power-producing fuel cells or a set of electrolysis cells running on steam-are designed to operate at very high fuel utilization. In the arrangement of this invention the main generator and the depleted fuel reactor sections are conveniently integrated within a common enclosure. The common enclosure can also contain steam inlet means to provide steam to heat feed oxidant and pre-reform feed fuel, as well as to feed a set of electrolysis cells. Stack reformer passages can also be positioned between the fuel cells in the generating chamber. Preferably, the fuel cells used in either the generator section or the depleted fuel reactor section are of the well known tubular type.

BRIEF DESCRIPTION OF THE DRAWINGS

For a better understanding of the invention, reference may be made to the exemplary embodiments shown in the accompanying drawings, in which.

DESCRIPTION OF THE PREFERRED EMBODIMENTS

Figure 1:
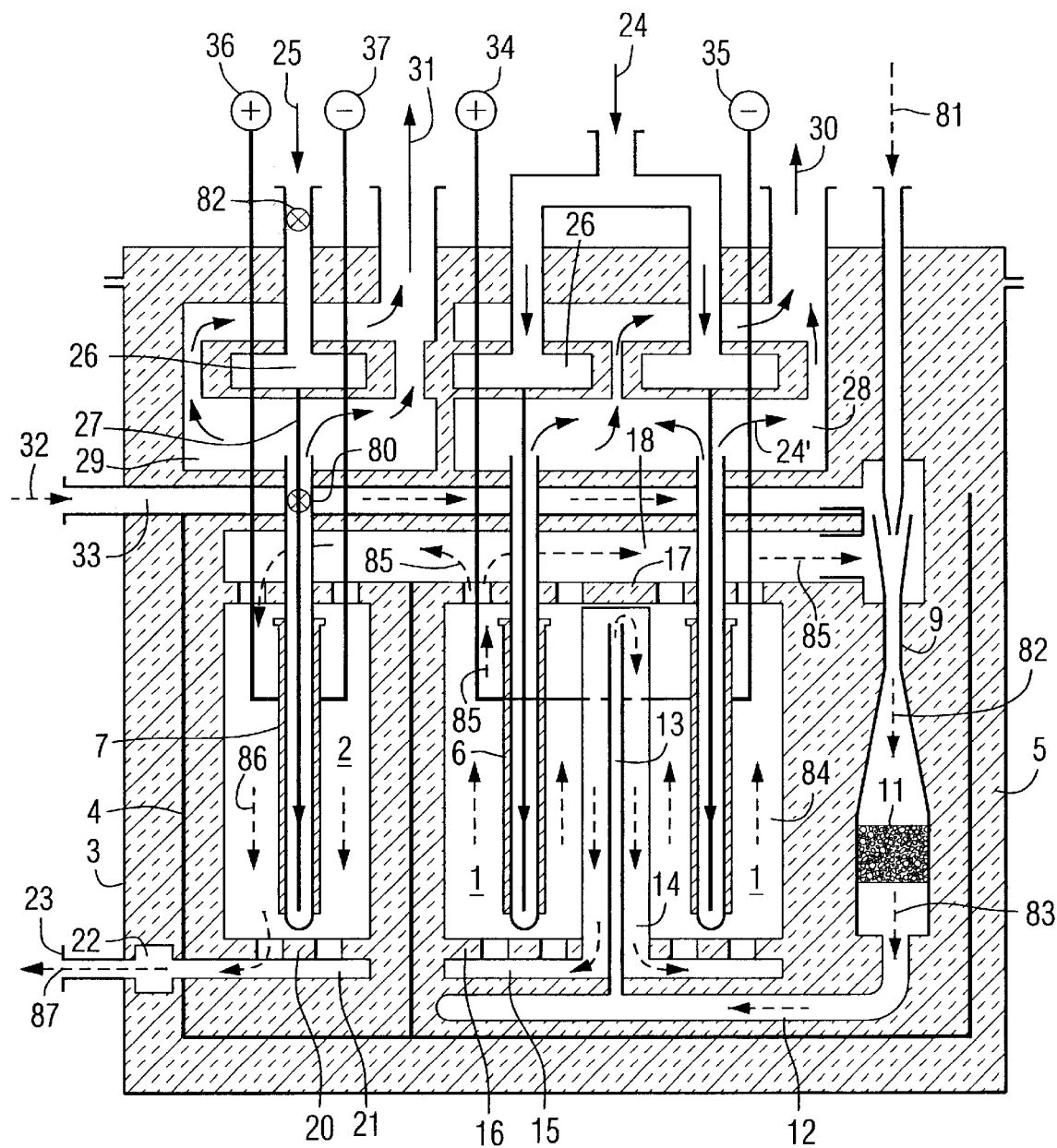
FIG. 1 is a sectional view of a segregated exhaust SOFC generator with integral secondary fuel reactor means, here shown (for simplicity) as another set of fuel cells, showing gas flow paths.

Referring now to FIG. 1, a fuel cell electrical power generator section/chamber 1 and a secondary depleted fuel reactor chamber 2 comprise the high temperature fuel cell generator shown housed within a typical outer metal enclosure 3. Typically, section 1 will operate at temperatures greater than 800° C., usually between 900° C. to 1100° C., Within the enclosure these two sections are separated and separately enveloped by high temperature alloy metal liners 4 which prevent the migration of fuel gas, shown here for the sake of clarity as dashed, or discontinuous arrows, from one section to the other and from both sections to the thermal insulation 5 which fills the space between these sections and the common outer enclosure 3. Within the generator section 1, a plurality of fuel cells, preferably SOFCs, shown here in tubular form as 6, usually with nickel cermet (nickel particles embedded in a zirconia skeleton) external fuel electrodes (anodes) and interior doped lanthanum manganite air electrodes (cathodes), are contacted at their respective anodes by gaseous fuel, such as CO and $H_2$ (which result from the reformation of $CH_3$, $C_2H_6$ and the like), and at their respective cathodes by an oxidant, usually air. Fuel utilization within the generator section 1 can reach up to about 85% and fuel utilization in secondary depleted fuel reactor chamber 2 will preferably operate at a fuel utilization of over 85%. By "fuel utilization" is meant the amount of electrochemical conversion of fuel fed into a section of the fuel cell generator to $CO_2$ and $H_2O$. Therefore, the depleted fuel composition at the top of the fuel cells 6 consists of about 15 vol. % to 30 vol. % unreacted fuel (CO and $H_2$), with the balance having been reacted electrochemically to $CO_2$ and $H_2O$ by the fuel cell, in the process of generating electricity. This 70 vol. % to 85 vol. % depleted fuel is further reacted in section/chamber 2 by either additional fuel cells or electrolysis cells, to deplete the fuel 85 more substantially to 86, yielding approximately 99 vol. % final conversion to $CO_2$ and $H_2O$.

Fuel gas 84, represented by dashed arrows, flows in a re-circulated upflow mode within the main generator section 1 and achieves its maximum utilization level at 85 (at the top of the cells 6). At this point a fraction (approximately ⅓) of the depleted fuel flow 85 is drawn off the loop and enters chamber 2. Within chamber 2, the depleted fuel 85 flows, in one embodiment shown, in a downward, once through mode over means to react substantially all of the fuel, shown her for simplicity as the plurality of SOFCs 7. Fuel utilization within chamber 2 extends from nominally 85% at inlet to a target value between 98% and 99% at exit. Thus, depleted flow 86, which is already preferably about 85% depleted in section 2, will further react to exit at 22 and 23 as about 99% utilized depleted fuel. The feed fuel gas stream 81 is the driving gas for an ejector pump 9 which the pump inducts a fraction of the partially depleted fuel stream and passes the mixture to a pre-reformer conditioner 11. Preferably from the pre-reformer the gas passes through feed flow pipes 12 each of which serve a multiplicity of riser tubes 13 within vertically oriented stack reformer passages 14.

Rows of stack reformer passages can be positioned between rows of SOFCs as shown. Additional stack reformers can flank the outer rows of cells. Reformer passages contain a distributed ceramic which is impregnated with a suitable reforming catalyst. An outer envelope of nickel foil (not specifically shown) prevents escape of the gas as it flows downward through the reformer passage. At the bottom the reformers discharge to a reformed fuel flow inlet plenum 15, whereupon the fuel 84 rises through a perforated entry baffle 16 before rising over the exterior of the cells in the main generator section 1. At the top of the cell stack, the now depleted fuel. 85 flows through a perforated exit flow manifold board 17 and enters the partially burned depleted fuel flow plenum 18. Within this plenum the flow divides, with the majority being inducted into the re-circulation loop to pass to the pre-reformer 11 as described above, and the minority being passed to section 2 as depleted fuel 85.

Figure 4:
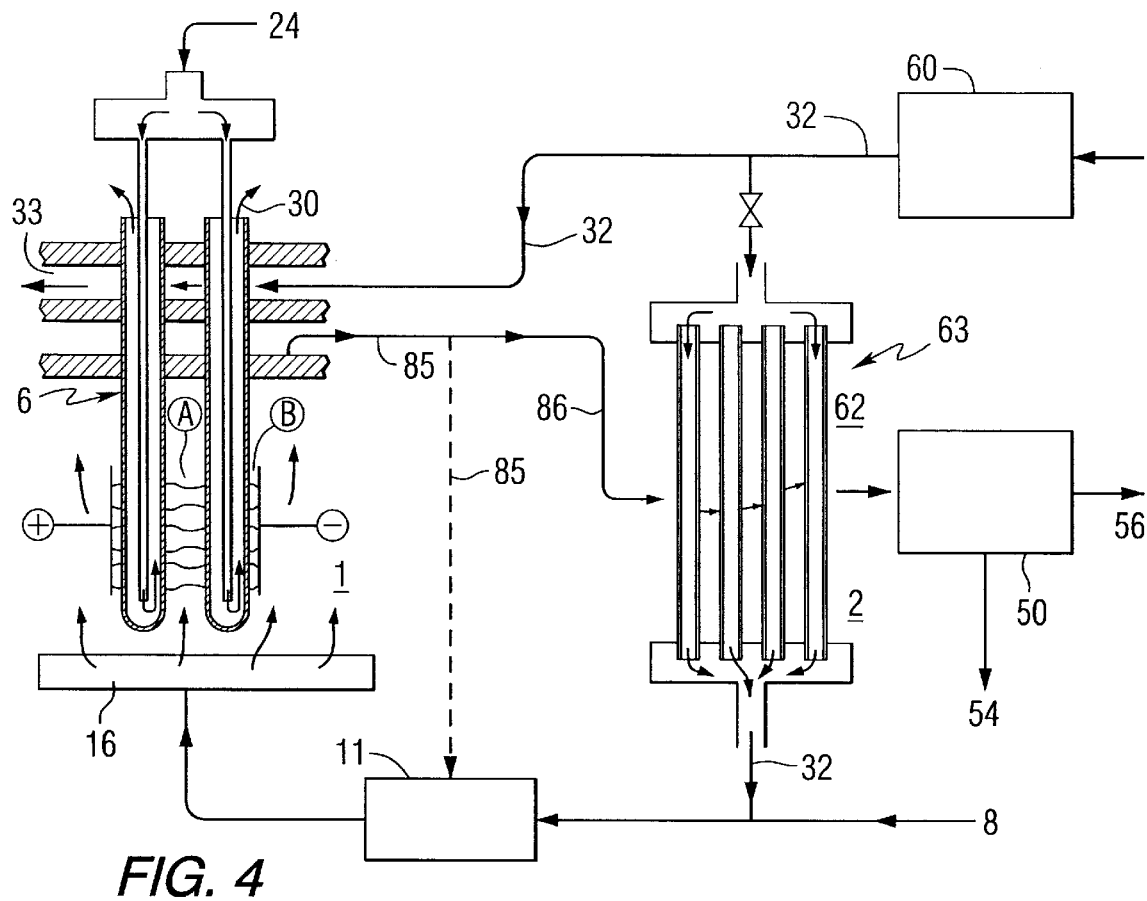
FIG. 4 is a schematic view of a SOFC generator where the means to react substantially all of the fuel are steam fed electrolysis cells.
Figure 5:
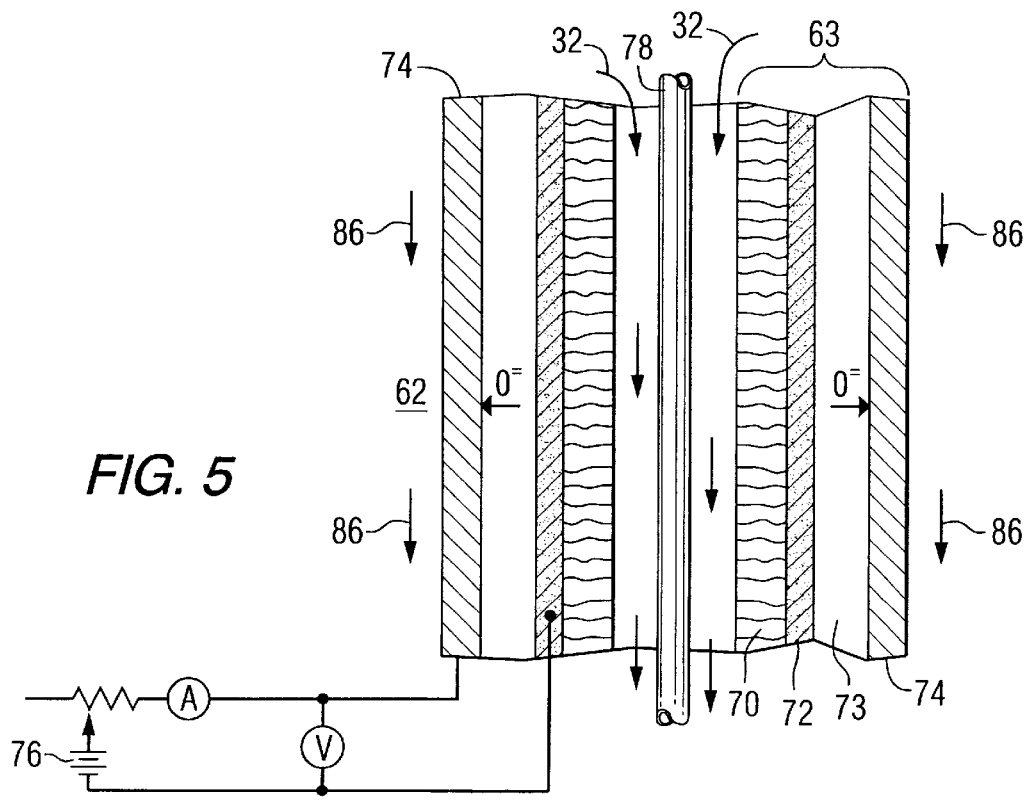
FIG. 5 is a cross-sectional view of an electrolysis system.

At the bottom of section 2, the products 87 flow through a perforated exhaust baffle 20 before entering a multiplicity of exhaust channels 21, which join as exhaust manifold duct 22. Products leave the enclosure 3 through an exhaust nozzle 23. No reformer passages ordinarily exist in sections 2. Thus means 12, 16, and the like are provided to flow a feed fuel gas to contact the fuel electrode of fuel cells in the generator chamber where the fuel can react and provide partially depleted fuel gas which passes through exit baffle 17. The partially depleted fuel flows to either the chamber 2 or the pre-reformer 11. There is no contact of the fuel, in any form, with air or oxidant, and hence no combustion. While the above description of the depleted fuel reactor (the means to react substantially all of the fuel) is of a fuel cell, it should be understood that electrolysis cell are also used (as shown in FIGS. 4 and 5).

Separate air streams 24 and 25 are provided for the embodiment shown, that is for the main generator and the depleted fuel reactor sections respectively. Within both sections the air enters feed headers 26 before descending through feed tubes 27, shown in FIG. 1 only as a single line, and then rising through the fuel cells 6 or 7 within the annulus formed by the cell I/D and the feed tube O/D. Oxygen-depleted, air 30 and 31 is discharged from the top open end of the cells into discharge plena 28 and 29 which are completely separated from fuel plenum 18 and which serve main generator section 1 and the shown depleted fuel reactor section 2, respectively. Separate exhaust nozzles pass the air exhaust from the enclosure to recuperative heat exchangers.

Figure 2:
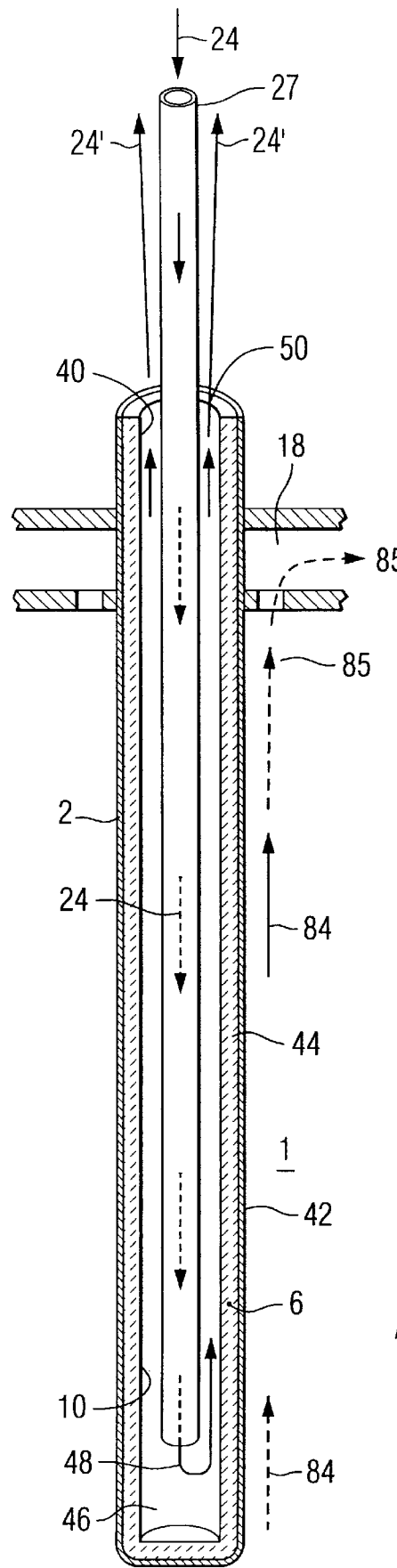
FIG. 2 is a detailed cross sectioned view of a fuel cell with associated oxidant feed inlet tube and depleted fuel gas exit plenum.

Referring now to FIG. 2, a more detailed view of a tubular SOFC is shown. The SOFC is shown as a tube having an air electrode 40 and a fuel electrode 42, with solid oxide electrolyte 44 (shown as a thin line) disposed between the electrodes. The fuel 84 passes around the fuel electrode 42 becoming more depleted or spent as it exits at fuel plenum exit 18 where it is completely separated from oxidant air 24, which enters hollow air feed tube 27, passing down through the fuel cell until it reaches the bottom 46 of the tube, where the air reverses direction, as shown at 48, and reacts as it flows upward inside the tube at the air electrode 40, exiting in an $O_2$-depleted state 24' at 50, without contact or combustion with the fuel in any form. The operation of the means to react substantially all of the depleted fuel in chamber 2, where fuel cells 7 are utilized, is substantially the same, except that in the embodiment shown in FIG. 1, fuel flows down the cell 7. In the alternate embodiment shown in FIG. 3, fuel flows across the fuel cells. Thus, in FIG. 1, means 26 and 27 allow a second feed oxidant gas 25 to flow to contact the air electrode of fuel cells 7 in the depleted fuel reactor section 2 to provide a second depleted oxidant gas 31. The finally depleted fuel at the bottom of chamber 2 consists of carbon dioxide, water and about 1% unreacted fuel which exits at 20 and 23, where it can be further processed, for example, to condense water, providing essentially pure segregated $CO_2$.

A steam stream 32 can be utilized horizontally through a barrier plenum 33, which can be sandwiched between the fuel re-circulation plenum and the $O_2$-depleted air exhaust plenum, thereby separating the two. Steam is permitted to leak through the small annular clearances between the boards which form the plena and the cell outer diameter. By this means the mixing of fuel and products with exhausting air is prevented. Steam which leaks into the exhaust air plenum is wasted, while that which leaks into the fuel side is in part used in the fuel reformation process at 11 and can be recovered in an external condenser. No fuel interacts with the oxidant in this design. Power leads 34 and 35 for the main generator section 1 and power leads 36 and 37 for chamber 2 connect to external loads. Within both main generator and secondary fuel reactor chamber, three parallel circuits (typically) negotiate a serpentine series path from low potential power lead to high potential power lead. The three circuits are parallel connected periodically in the series path. Also, a control means (not shown) can be used to regulate oxidant and fuel flows to prevent oxidation of the fuel electrodes associated with the fuel cells. Additionally, an oxygen sensor at the depleted fuel exit 23 can be used to monitor the exit oxygen partial pressure and-with suitable control-to modulate current to avoid fuel cell 7 anode oxidation within chamber 2.

Figure 3:
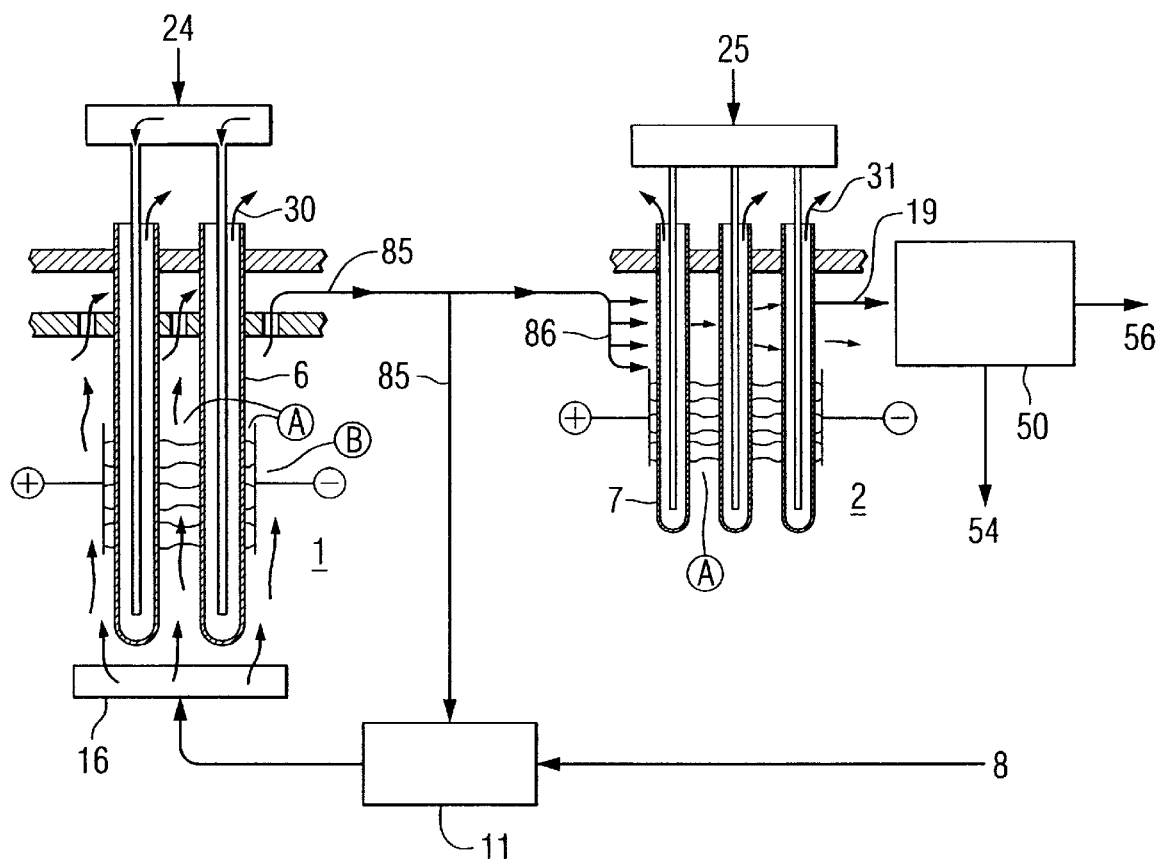
FIG. 3 is a schematic view of a SOFC generator, where the means to react substantially all of the fuel are oxidant fed fuel cells.

Referring now to FIG. 3, which is a generalized view of the embodiment shown in FIG. 1, generator section has air feed 24 and fuel cells 6, and a separate secondary fuel reactor chamber 2—containing a depleted fuel reactor which can be electrolysis cells or fuel cells 7 (shown)—has separate air feed 25 which helps cool the fuel cells 7. Partially depleted fuel streams are kept separate from depleted air 30. The partially depleted fuel stream 85 passes to chamber 2, where it contacts the outside fuel electrodes of additional fuel cells 7, either in a downward fashion or across the cells (as shown here), and is further almost completely depleted of $CO_2$ and $H_2O$, which can pass to $CO_2$ sequestration means 50, where steam ($H_2O$) can be condensed and passed into stream 54, yielding essentially pure $CO_2$ exiting as stream 56.

SOFC generators usually operate at temperature levels (approximately 900° C. to 1100° C.) in section 1 where only exterior nickel fuel electrodes and cell connectors A and B are a practical and economical material choice. The combustion of fuel to near 100% in an SOFC with nickel fuel electrodes is not possible, because the metallic nickel would be oxidized electrochemically and the anode would be mechanically destroyed as a result. Therefore, the fuel electrodes and cell connectors A of the fuel cells 7, shown in FIG. 3, in secondary fuel reactor chamber 2 are preferably made with copper as the conducting metallic component of the fuel electrode. Copper electrodes are more resistant to oxidation than nickel and can burn fuel to a higher degree of completion. However, copper electrodes, due to the low melting point of copper (1083° C.) do not have the high temperature resistance for long term operation that nickel electrodes have. Due to efficiency and cost considerations, SOFC generators operate at temperatures that are too high for an all-copper fuel electrode design. However, banks of solid oxide fuel cells 7, used as the depleted fuel reactor, can be incorporated into SOFC generators in a lower temperature region (<900° C.), where copper becomes a viable fuel electrode material. The copper fuel electrodes are connected via copper fiber felts to electrical cell interconnections to air electrodes of adjacent cells to accomplish an electrical series connection. The fuel cells 7 in chamber 2, although operating on very lean fuel (spent fuel of section 1), contribute to more efficient fuel utilization and contribute to increased plant efficiency. In FIG. 3, filter felts of Ni are shown as A in section 1, and fiber felts of Cu are shown as A in section 2, both of which act as electrical connectors. In FIGS. 3 and 4, entry fuel 8 feeds into fuel conditioner 11.

The fuel cell bundle in chamber 2 must be positioned in a way that allows cell cooling with the inlet air 25 or with cooled (heat exchanged) spent fuel 86 or a combination of both schemes, in order to allow the use of copper as a construction material for fuel electrodes, cell interconnection felt contacts, and power contacts. The degree of spent fuel oxidation is controlled by the current flow through the solid oxide afterburner cell bundle and must be limited so as to prevent the electrochemical oxidation of the copper electrodes or the copper felt cell-to-cell interconnection, or copper bus bars. An oxygen sensor in the exit fuel combustion product stream is used as the control element for limiting the oxygen activity at afterburner exit. The SOFC generator anode exit (or exhaust) is thus prepared for carbon dioxide sequestration in the unit 50 with the aid of SOFC afterburner cells 7 in secondary fuel reactor chamber 2 with copper fuel electrodes.

FIG. 4 shows another embodiment of the invention. Here steam 32 from a water fed steam generator 60 (the water is shown as the feed arrow) is fed to barrier plenum 33, part of which steam may also be fed to fuel pre-reformer conditioner 11 after passage through chamber 2. The steam 32 is also fed inside electrolysis cell bundle 62 of cells 63. The air feed 24 here is only to fuel cells 6. The partially depleted fuel stream passes to chamber 2 where it contacts the outside fuel electrode of the electrolysis cell bundle 62 and is further almost completely depleted to $CO_2$ and $H_2O$ which can pass to $CO_2$ sequestration means 50, where steam ($H_2O$) can be condensed at 54, yielding essentially pure $CO_2$ at 56.

There are advantages to use of an electrolysis cell type section 2, shown as 62 in FIG. 4 and in more detail in FIG. 5, over use of a fuel cell system as the depleted fuel reactor.

Referring now to FIG. 5, a porous ceramic structural support tube 70, made of, for instance, calcia-stabilized zirconia, is coated with a porous, nickel-zirconia or copper-zirconia cermet electrode 72. This cermet electrode is overlaid with a thin solid oxide electrolyte layer 73, such as yttria-stabilized zirconia, which is in contact with a copper electrode 74, similar to the one described for the fuel cell depleted fuel reactor in FIG. 3. Again, a tubular cell structure is the preferred one, however planar geometries for cells can also be envisioned. The copper outer fuel electrode 74 is exposed to a fraction of the effluent spent fuel of the SOFC generator of chamber 1 (while steam 32 or the balance of spent fuel $CO_2$, $CO$ and $H_2$—not shown) flows through the tube inside. While spent fuel is shown flowing parallel to electrolysis cells 62 in FIG. 5, such a flow can also be across the cells, as shown in FIG. 4. Water vapor from steam, or water vapor and carbon dioxide from spent fuel, permeate the porous ceramic support 70 and the porous cermet electrode structure 72. The inner nickel or copper electrodes 72 of this type of electrolysis cells are connected to the negative terminal, and the outer copper electrodes 74 to the positive terminal, of a controlled DC power supply 76. The composite cell wall is shown as 63. By passing a current between the electrodes, oxygen is extracted from water vapor and carbon dioxide, which migrates as oxygen ions, shown as $O^+$, through the solid-yttria-stabilized zirconia electrolyte 73 and combines with the spent fuel at the copper electrode to form water vapor and carbon dioxide. The gas streams through the cell inside and over the outside are separated.

The interior gas flow is enriched with hydrogen by the electrolytic action of the electrical current, in the case of a pure steam flow, or with a mixture of hydrogen and carbon monoxide when spent fuel passes over the interior electrode. Also note that, in the FIG. 1 design, a steam inlet valve 80 and air cutoff valve 82 could allow similar operations with some modification to cells 7 in chamber 2. The degree of spent fuel oxidation is controlled by the electrical current from the DC power supply 76. A voltmeter and an ampmeter are shown respectively as V and A. An oxygen sensor in the generator effluent combustion gas flow would be the control element for the operation of the power supply, in order to assure a safe oxygen activity in the effluent gases for preventing the oxidation of the copper electrode and other cell stack components, such as copper felt cell electrical connections and electrical power bus bars.

It is of importance that the temperature of any of the solid oxide cells 7 or 62 in chamber 2 with copper electrodes is controlled to a temperature level (<900° C.) that is safe for long-term operation. Therefore, an additional cooling feature in FIG. 5 in the form of a tube 78 which can be inserted into the depleted fuel reactor means. This tube, made of oxidation-resistant metals or ceramics, can serve as a duct for colder steam, air or spent fuel, in order to be in active heat exchange with the depleted fuel reactor means and maintain an appropriate temperature level.

The present invention may be embodied in other forms without departing from the spirit or essential attributes thereof, and accordingly, reference should be made to both the appended claims, and to the foregoing specification as indicting the scope of the invention.

What is claimed is:

1. A high temperature fuel cell generator comprising:
    a separate generator chamber containing tubular solid oxide electrolyte fuel cells which operate on oxidant and fuel to yield depleted oxidant and depleted fuel, and
    a separate fuel reactor chamber containing a depleted fuel reactor, selected from a fuel cell and an electrolysis cell,
    where all oxidant and fuel passages are separated and do not communicate directly with each other, so that fuel and oxidant remain effectively separated,
    where a depleted fuel exit is provided in the separate fuel reactor chamber for exiting a gas consisting essentially of carbon dioxide and water for further treatment, and
    where depleted oxidant exits are provided to exhaust to the environment.

2. A high temperature fuel cell generator, comprising:
    (1) a housing defining and separating a generator chamber;
    (2) a separate fuel reactor chamber;

(3) a depleted oxidant discharge chamber;
(4) a plurality of fuel cells, each having an electrolyte contacted on one side by an air electrode and on the other side by a fuel electrode, said fuel cells disposed within the generator chamber;
(5) means to react substantially all of the fuel, said means selected from oxidant-fed fuel cells and steam-fed electrolysis cells disposed in the separate fuel reactor chamber;
(6) means to flow a feed fuel gas to contact the fuel electrode of fuel cells in the generator chamber, where said fuel can react and provide partially depleted fuel gas;
(7) means to flow a feed oxidant gas to contact the air electrode of fuel cells in the generator chamber, where said oxidant can react and provide a depleted oxidant gas;
(8) means to flow a second feed oxidant gas to the separate fuel reactor chamber, where the means to react substantially all of the fuel is a fuel cell, or means to flow steam to the separate fuel reactor chamber, where the means to react substantially all of the fuel is an electrolysis cell; and
(9) means to flow partially depleted fuel gas from the generator chamber to contact the outside of the means to react substantially all of the fuel in the separate fuel reactor chamber, where said depleted fuel can further react and provide a completely depleted fuel gas consisting essentially of carbon dioxide and water, where depleted oxidant gases are kept separated from all depleted fuel gases and said depleted oxidant gases flow into separate depleted oxidant discharge chambers.

3. The fuel cell generator of claim 2, having an associated condensing means to condense water so that the completely depleted fuel gas consists essentially of carbon dioxide.

4. The fuel cell generator of claim 2, having an associated condensing means to condense water so that the completely depleted fuel gas consists essentially of carbon dioxide, and where the generator has an associated liquefaction means to liquefy carbon dioxide.

5. The fuel cell generation of claim 2, where the fuel cells comprise flat or tubular electrolyte disposed between electrodes.

6. The fuel cell generator of claim 2, where electrolysis cells are used as the means to react substantially all of the fuel.

7. The fuel cell generator of claim 2, where fuel cells are used as the means to react substantially all of the fuel.

8. The fuel cell generator of claim 2, where the separate fuel reactor chamber is cooled by feed oxidant or cooled spent fuel, and where the fuel electrodes of means to react substantially all of the fuel are made of copper.

9. The fuel cell generator of claim 2, operating to produce electric power and sequester carbon dioxide.

10. The fuel cell generator of claim 2, operating on pressurized inlet gases, selected from the group consisting of oxidant, steam and fuel.

* * * * *